(12) United States Patent
Riehmann et al.

(10) Patent No.: US 10,357,099 B2
(45) Date of Patent: Jul. 23, 2019

(54) BACK CARRIER AND AN EXTENSION PLATE FOR A BACK CARRIER

(71) Applicant: Andreas Stihl AG & Co. KG, Waiblingen (DE)

(72) Inventors: Jens Riehmann, Stuttgart (DE); Markus Zeller, Schwaebisch Gmuend (DE); Harald Schliemann, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 15/674,433

(22) Filed: Aug. 10, 2017

(65) Prior Publication Data

US 2018/0042365 A1   Feb. 15, 2018

(30) Foreign Application Priority Data

Aug. 10, 2016  (DE) .................. 10 2016 009 753

(51) Int. Cl.
| | |
|---|---|
| *A01G 20/43* | (2018.01) |
| *A45F 3/14* | (2006.01) |
| *B08B 13/00* | (2006.01) |
| *A45F 3/04* | (2006.01) |
| *A45F 3/08* | (2006.01) |

(Continued)

(52) U.S. Cl.
CPC ............. *A45F 3/14* (2013.01); *A01G 20/43* (2018.02); *A45F 3/047* (2013.01); *A45F 3/08* (2013.01); *A45F 3/10* (2013.01); *B08B 13/00* (2013.01); *A45F 2003/001* (2013.01); *A45F 2003/045* (2013.01); *A45F 2003/146* (2013.01)

(58) Field of Classification Search
CPC .... A45F 3/14; A45F 3/047; A45F 3/08; A45F 3/10; A45F 2003/001; A45F 2003/045; A45F 2003/146; A01G 20/43; B08B 13/00
USPC ........ 224/628, 629, 261, 262, 271, 272, 259
See application file for complete search history.

(56) References Cited

U.S. PATENT DOCUMENTS

| | | |
|---|---|---|
| 6,536,641 B1 | 3/2003 | Sundara et al. |
| 7,198,186 B2 * | 4/2007 | Kling ................ A62B 9/04 |
| | | 224/628 |

(Continued)

FOREIGN PATENT DOCUMENTS

| | | | |
|---|---|---|---|
| DE | 8716869 U1 | 3/1988 | |
| GB | 2152575 A * | 8/1985 | ............. A45F 3/047 |

(Continued)

*Primary Examiner* — Justin M Larson
*Assistant Examiner* — Matthew T Theis
(74) *Attorney, Agent, or Firm* — Walter Ottesen, P.A.

(57) ABSTRACT

A back carrier has a back plate and a shoulder strap. The back plate has a longitudinal extent and, in the direction of its longitudinal extent, has an upper and a lower end section. The upper end section reaches as far as the upper end of the back plate. The strap extends on the back side of the back plate, which faces toward the back of a user. The strap is fastened with a first strap section in the area of the upper end section to an upper fastening location and is fastened with a second strap section in the area of the lower end section to a lower fastening location. In the area of the upper end section, the back plate has a recess for receiving an extension plate. In the direction of the longitudinal extent, the recess is open toward the upper end of the back plate.

17 Claims, 10 Drawing Sheets

(51) Int. Cl.
*A45F 3/10* (2006.01)
*A45F 3/00* (2006.01)

(56) References Cited

U.S. PATENT DOCUMENTS

2008/0264236 A1* 10/2008 Miyajima .............. G10G 5/005
                                                                                   84/421
2016/0198636 A1* 7/2016 Poole .................... A01G 1/125
                                                                                   15/327.5

FOREIGN PATENT DOCUMENTS

| JP | S51145168 U | 11/1976 |
| JP | 2013091203 A | 5/2013 |

* cited by examiner

BACK CARRIER AND AN EXTENSION PLATE FOR A BACK CARRIER

CROSS REFERENCE TO RELATED APPLICATION

This application claims priority of German patent application no. 10 2016 009 753.1, filed Aug. 10, 2016, the entire content of which is incorporated herein by reference.

FIELD OF THE INVENTION

The invention relates to a back carrier having a back plate and at least one shoulder strap, wherein the back plate has a longitudinal extent and, in the direction of its longitudinal extent, has an upper end section and a lower end section. The upper end section reaches as far as the upper end of the back plate, wherein the back plate has a load side, which faces toward a load that is to be carried. The back plate moreover has a back side, which faces toward the back of a user. The shoulder strap extends on the back side, wherein the shoulder strap is fastened with a first strap section in the area of the upper end section to an upper fastening location and is fastened with a second strap section in the area of the lower end section to a lower fastening location. The invention further relates to an extension plate for a back carrier.

BACKGROUND OF THE INVENTION

Back carriers with one or more shoulder straps are well known from the prior art. The wearing comfort of such back carriers depends on how well the height of the user and the length of the back plate of the back carrier can be adapted to each other.

In addition, back carriers can be provided with or without a hip belt. In a back carrier without a hip belt, the weight of the back carrier and of its load is transferred to the shoulders of a user largely via shoulder straps. The back carrier rests on the lower back of the user via a user contact surface, and the shoulder straps lie on the shoulders of the user. The shoulder straps are fastened to an upper fastening location of the back carrier. When the back carrier is being worn, these fastening locations lie below the shoulders of the user in the vertical direction. A relatively large contact surface of the shoulder straps on the shoulders and the back of the user can thus be achieved in order to distribute the applied weight across a large surface area.

JP 2013-091203 A discloses a back carrier in which several upper fastening locations are provided. Such a back plate is stiff and, when using adapted fastening locations, a very considerable length of the back plate protrudes upward and can get in the way when using the back carrier.

In a back carrier with a hip belt, the load on the shoulders is significantly reduced, since at least a large part of the weight is transferred from the hip belt to the user's waist. Only a small part of the weight is transferred to the shoulders of the user via the shoulder straps.

U.S. Pat. No. 6,536,641 B1 discloses a back carrier with a system for changing the distance between the hip belt and the upper fastening location of the shoulder strap. For this purpose, two rods are provided at the lower end of the back plate and can be pulled out steplessly from the back plate, between which rods a padding is held for resting on the region of the user's hips. The upper end of the shoulder strap is arranged on the back plate, while the lower end is arranged on the rod. Telescopic systems have a low level of stiffness and are expensive to produce. The extension of the back plate in the downward direction makes it difficult to park the back carrier safely on the ground. Moreover, the center of gravity of the loaded back carrier climbs higher relative to the user's back, which impairs wearing comfort, particularly on uneven ground.

If the same back carrier is intended to be used with different carrying systems (with or without hip belt in addition to the shoulder strap) and if the hip belt or the contact surface is to be arranged at the same height on the back plate, it is necessary to adapt the carrying system and its attachment to the back plate.

SUMMARY OF THE INVENTION

It is an object of the invention is to provide a back carrier which is easy to produce and can be used equally well with different carrying systems and which, without impairing wearing comfort, ensures that the load is fixed securely on the back of a user.

A further object of the invention is to provide an extender for easily extending a back plate.

As regards the back carrier, the object is achieved by the fact that, in the area of the upper end section, the back plate has a recess for receiving an extension plate, and, in the direction of the longitudinal extent of the back plate, the recess is open toward the upper end of the back plate.

As regards the extender for extending the back plate, the object is achieved by an extension plate which is rigid and formed in one piece, wherein the extension plate has its greatest extent in a spatial direction designated as the width direction and has a maximum height measured in a vertical direction perpendicular to the width direction. The extension plate moreover has a maximum thickness measured in a thickness direction perpendicular to the vertical direction and to the width direction. The width is greater than the maximum height, and the maximum height is greater than the maximum thickness. At least one fastening location for a first strap section of the back carrier is arranged in the extension plate, and an attachment element for attaching the extension plate to the back carrier.

Since the back plate, in the area of the upper end section, has a recess for receiving an optional extension plate, and since, in the direction of the longitudinal extent of the back plate, the recess is open toward the upper end of the back plate, an extension plate can be fitted in the recess and can form a flush continuation of the back plate in order to extend the latter in the vertical direction.

The recess provided makes it possible to optionally extend the back plate, and therefore the problem of adapting the position of the upper fastening location of the shoulder straps according to the used carrying system is easily solved. If the back carrier is optimized for a carrying system without a hip belt, the fastening locations of the shoulder straps can be arranged higher up if so required, that is, if a hip belt is needed, by using an extension plate. If the back carrier is optimized for a carrying system with a hip belt, it is then possible if so required, that is, if no hip belt is wanted, to arrange the fastening locations of the shoulder straps farther down on the back plate, without use of the extension plate. One and the same back plate can be easily used for different carrying systems, without impairing the wearing comfort or the safety of the load on the back of the user. Moreover, the back carrier is just as effective without the use of the extension plate as it is with the use of the extension plate.

An optional extension plate can be fixed in a stable manner on the back carrier by bearing in the recess on the back plate. The recess in the back plate is easy to produce, this recess in the back plate being open toward the upper end of the back plate. A fitted extension plate can protrude above the upper end of the back plate in the direction of the longitudinal extent of the back plate. In this way, the back plate can be easily lengthened in the direction of its longitudinal extent by insertion of the extension plate into the recess. The alternative fastening locations on the extension plate are advantageously just as stiff, with respect to the back plate, as the upper fastening locations that are formed directly on the back plate. A stable back surface of the back carrier is thus made available with and without a fitted extension plate.

The first strap section of the shoulder strap is advantageously fastened to the upper fastening location in the area of the recess of the back plate. With the extension plate fitted in the recess, the first strap section of the shoulder strap is fastened to an alternative fastening location on the extension plate. It is thus ensured that the first strap section of the shoulder strap can be securely fastened in the upper area of the back carrier both when an extension plate is fitted and also when the back carrier is used without an extension plate.

With the extension plate fitted, the upper fastening location in the area of the recess of the back plate is expediently covered by the extension plate. This ensures that the first strap section of the shoulder strap cannot be fastened to the wrong fastening location when the extension plate is fitted. With the extension plate fitted, the first strap section of the shoulder strap can be fastened to the alternative fastening location and can no longer be fastened to the upper fastening location in the area of the recess of the back plate. The upper fastening location of the back carrier can be arranged directly in the recess in the upper end section of the back carrier. The surface area via which the back plate of the back carrier bears on the back of a user is large.

Advantageously, the upper fastening location of the first strap section on the back plate has a first distance from a lower end of the lower end section of the back plate, and the alternative fastening location on the extension plate has a second distance from the lower end. The lower end in each case lies at the same height.

Advantageously, the upper fastening location of the first strap section on the back plate has a first distance from a lower fastening location at the lower end of the back plate, and the alternative fastening location on the extension plate has a second distance from the lower fastening location at the lower end of the back plate.

The alternative fastening location is situated in the upper part of the extension plate protruding above the back plate, such that the alternative fastening location lies above the upper fastening location of the back plate in the vertical direction. This ensures that the first strap section of the shoulder strap lies farther from the lower end of the back plate when the extension plate is fitted than it does when the back carrier is used without an extension plate. The back carrier can be easily adapted to the carrying system used with the back plate. Via the extension plate, the back plate can be easily lengthened in the longitudinal direction, such that a larger back surface can be provided on the back of a user. In this way, the back carrier can be used not only with different carrying systems, but also as a modular add-on to a standard back plate for groups of users who have a longer torso.

The first distance and second distance are measured in the direction of the longitudinal extent of the back carrier. In the direction of the longitudinal extent of the back plate, the back carrier bears on the back of a user over a larger surface area than it does when the back carrier is used without an extension plate.

Advantageously, when an extension plate is fitted in the recess of the back plate, the extension plate protrudes above the upper end of the back plate. The extension plate and the back plate expediently overlap in the direction of the longitudinal extent of the back plate. The extension plate can thus be fixed in a stable manner on the back plate.

In particular, the extension plate has a maximum height in the direction of the longitudinal extent of the back plate, wherein the extension plate bears with at least one quarter of its height, in particular at least one third of its height, on the back plate. This results in a stable connection between the extension plate and the back plate.

In particular, the recess has a recess width measured perpendicularly with respect to the longitudinal extent of the back plate, and the recess width is at least two thirds of a lateral width of the back plate measured in the same direction. The direction of the longitudinal extent of the back plate and the direction in which the lateral width of the back plate extends together span a plane that runs substantially parallel to the back of a person using the back carrier. The extension plate has a width measured perpendicularly with respect to the longitudinal extent of the back plate, wherein the width is at least two thirds of the lateral width of the back plate measured in the same direction. The area in which the extension plate and the back plate overlap each other can thus be configured with a large surface. This results in a stable connection between the extension plate and the back plate.

The extension plate expediently has at least two alternative fastening locations. A maximum distance measured between the two fastening locations in a direction perpendicular to the longitudinal extent of the back plate corresponds to at least two thirds of the width of the extension plate measured in a direction perpendicular to the longitudinal extent of the back plate. The weight of the back carrier can thus be transferred to a user uniformly via the at least two alternative fastening locations. The use of at least two carrying straps is also possible. Each carrying strap can be assigned to a respective shoulder of the user. The wearing comfort experienced by the user is enhanced. The forces acting on the extension plate are distributed across a large area of the extension plate.

Advantageously, the back side of the back plate and the extension plate fitted in the recess form a common back surface of the back carrier. The back surface is the surface of the back carrier that lies facing toward the user. When no extension plate is fitted, the back surface corresponds to the surface of the back side. When an extension plate is fitted, the back surface is enlarged by the surface of the extension plate facing toward the user.

The extension plate expediently adjoins the back plate in such a way that the extension plate forms a stepless continuation of the contour of the back plate. The entire back surface advantageously lies in one plane. In a direction perpendicular to the longitudinal extent and perpendicular to the direction in which the width of the back plate extends, the extension plate advantageously does not protrude beyond the thickness of the back plate. This enhances the wearing comfort experienced by the user. The back side can bear directly or indirectly on the user's back.

Advantageously, the extension plate is rigidly connected to the back plate. This results in a stable connection between extension plate and back plate. A relative movement of extension plate and back plate is suppressed.

Advantageously, the upper fastening location is arranged in the recess. The upper fastening location is arranged in the upper end section of the back plate. The carrying strap can extend over a large part of the longitudinal extent of the back plate.

A first through-opening is formed in a base of the recess of the back plate and can lie overlapping a second through-opening of the extension plate fitted in the recess. The first opening and the second opening form a common receptacle for a hook. The back carrier can also be easily hung up when an extension plate is fitted. At least some of the weight of the loaded back carrier is transferred directly from the second through-opening of the back plate to the hook. In this way, the connection between extension plate and back plate is subjected to less stress.

A load is advantageously arranged on the back carrier, with the back carrier and the load forming one structural unit. A grip for carrying the unit can be formed on the load. The grip can thus be configured independently of the extension plate. The unit can be carried regardless of whether the extension plate is fitted or not. The grip can be arranged on the load in such a way that it is possible to grasp it all the way round without obstruction, both when the extension plate is fitted and also when the extension plate is removed.

The extension plate for a back carrier is advantageously rigid and formed in one piece. The extension plate has its greatest extent in a spatial direction designated as the width direction. The extension plate has a maximum height measured in a vertical direction perpendicular to the width direction, and a maximum thickness measured in a thickness direction perpendicular to the vertical direction and to the width direction. The width is greater than the height, and the height is greater than the thickness. At least one fastening location for a first strap section of the back carrier is arranged in the extension plate, and/or an attachment element for attaching the extension plate to the back carrier.

Advantageously, the extension plate is curved about its vertical direction. The extension plate can be adapted to the shape of the back of a user.

In particular, the extension plate has a lower half and an upper half in the vertical direction, wherein the attachment element is arranged in the lower half of the height and fastening location is arranged in the upper half of the height. Via the attachment element in its lower half, the extension plate can be fastened with the lower half to a back carrier, while at the same time the fastening location at the upper half of the height of the extension plate can protrude above the back carrier. The fastening location can be arranged higher via the extension plate. The extension plate has in particular a plane of symmetry lying in the vertical direction and the thickness direction.

The extension plate has a first thickness in the upper half and a second thickness in the lower half. The first thickness is advantageously greater than the second thickness. The extension plate lies with its lower half in the recess, while the upper half lies outside the recess. The extension plate can be arranged on the back plate in such a way that it forms a common back surface with the back carrier.

The contact surface of the back plate, provided at the lower end of the back plate, lies at approximately the same height of the back carrier both when the back carrier is used without a hip belt and when the back carrier is used with a hip belt, in particular at the same height on the back of a user. The position of the contact surface thus remains the same independently of the use of an extension plate.

The position of the load on the back carrier with respect to the user remains the same independently of the use of an extension plate. When using a load, in particular a work apparatus or a battery pack, arranged on the back carrier, the ergonomics thus remain particularly well adapted to the user independently of the use of an extension plate.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
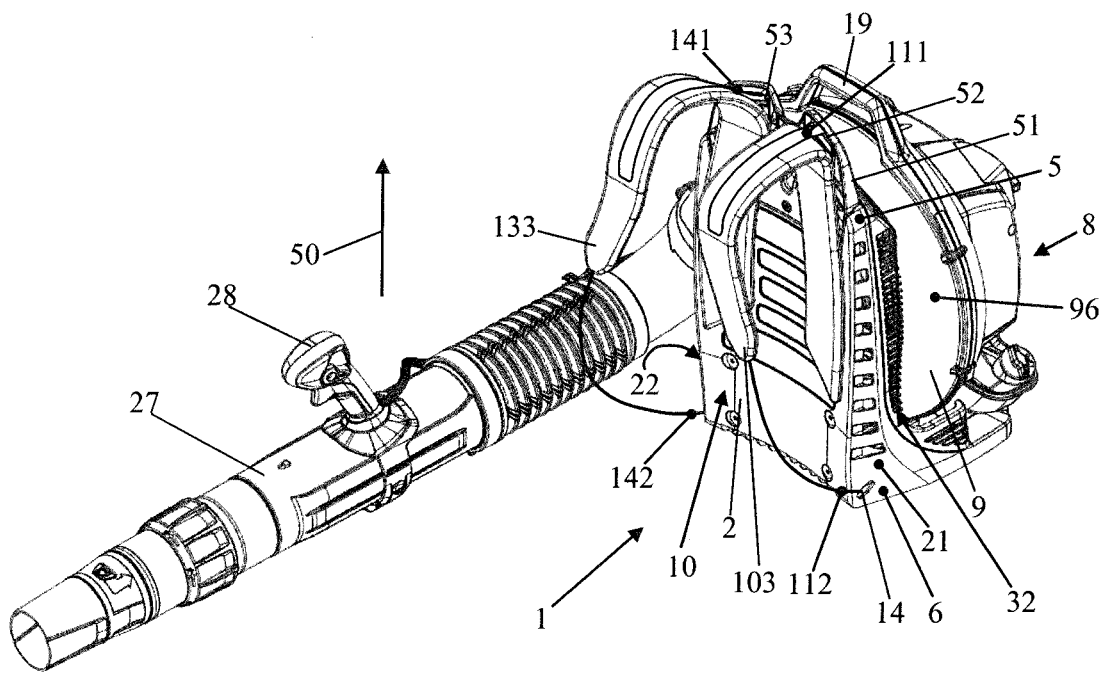
FIG. 1 shows a perspective schematic view of a back carrier according to the invention, with a fitted extension plate, and with a load configured as a work apparatus and fastened to the back carrier.

FIG. 1 shows a back carrier 1 according to the invention, which is intended for carrying a load 9 that is configured as a blower apparatus carried on one's back. The blower apparatus includes a motor unit, which is arranged on the back carrier 1. The blower apparatus moreover includes a blower tube 27. A handle 28 for guiding the blower tube 27 and for controlling the motor power is fastened on the blower tube 27. The back carrier 1 can also be used for carrying other work apparatus or other loads, for example, a battery pack carried on one's back.

The back carrier 1 includes a back plate 2 and, in the embodiment, a base plate 4. The back plate 2 and the base plate 4 advantageously lie at a right angle to each other. The back plate 2 has a longitudinal extent 50. In the direction of its longitudinal extent 50, the back plate 2 has a lower end section 6 and an upper end section 5. The direction of the longitudinal extent 50 runs in the direction from the lower end section 6 to the upper end section 5. The back plate 2 has a load side 8 and a back side 10. The load 9 is arranged on the load side 8. In the embodiment, the load 9 is supported on the base plate 4. The base plate 4 is connected to the back plate 2 in the lower end section 6 of the back plate 2. The back side 10 is intended to bear directly or indirectly on the back of a user. The load can also be supported directly on the load side 8 of the back plate 2.

The back carrier 1 includes an optional extension plate 51. The optional extension plate 51 is arranged in the area of the upper section 5 of the back plate 2. As is shown in FIGS. 1 to 4, the extension plate 51 is fittable and removable. The back carrier 1 can be used electively with or without extension plate 51. Through use of the extension plate 51, the back carrier 1 can be used for a carrying system with shoulder straps and/or hip belt 120. Without a fitted extension plate 51, the back plate 2 still has an upper and a lower fastening location for the shoulder strap.

The back plate 2 can also be used on its own as back carrier 1. The fitting of the extension plate 51 is optional. The back carrier without the use of the extension plate functions just as well as it does with the use of the extension plate. The upper fastening locations are rigid and non-displaceable on the back carrier 1. The alternative fastening locations are rigid and non-displaceable on the back carrier 1.

Figure 7:
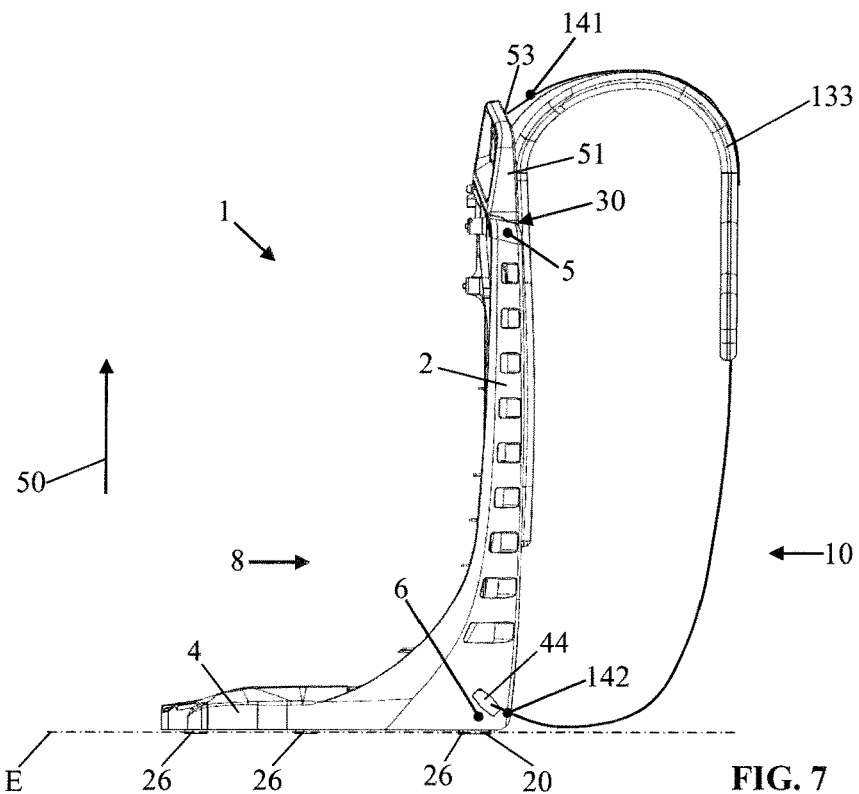
FIG. 7 shows a side view of the back carrier according to FIG. 6.

As is shown in FIG. 1, two long shoulder straps 103, 133 are provided on the back side 10 of the back plate 2. The shoulder strap 103 has a first strap section 111 and a second strap section 112. The shoulder strap 133 has a first strap section 141 and a second strap section 142. The extension plate 51 includes an alternative fastening location 52 and an alternative fastening location 53. The long shoulder strap 103 is fastened, in the area of the first strap section 111, to the alternative fastening location 52. The second strap section 112 of the long shoulder strap 103 is fastened to a lower fastening location 14 of the back plate 2. The lower fastening location 14 is arranged in the area of the lower end section 6 of the back plate 2. The back plate 2 has a lateral edge 21 and a lateral edge 22. The lateral edges 21, 22 lie opposite each other. The lateral edge 21 and the lateral edge 22 extend in the direction of the longitudinal extent 50. The lateral edge 21 and the lateral edge 22 are arranged between the back side 10 and the load side 8 of the back plate 2 and connect the back side 10 to the load side 8. The lateral edge 21 is assigned to the left shoulder of a user, and the lateral edge 22 is assigned to the right shoulder of a user. In the lower end section 6 of the back plate 2, the lower fastening location 14 is arranged on the lateral edge 21. In the lower end section 6 of the back plate 2 a lower fastening location 44, shown in FIG. 7, is arranged on the lateral edge 22. In the embodiment according to FIG. 1, the second strap section 112 of the long shoulder strap 103 is fastened to the lower fastening location 14. Accordingly, the second strap section 142 of the long shoulder strap 133 is fastened to the lower fastening location 44 of the back plate 2.

The long shoulder straps 103, 133 extend in the direction of the longitudinal extent 50. The first strap section 111 of the long shoulder strap 103 is fastened to the alternative fastening location 52 of the extension plate 51. The first strap section 141 of the long shoulder strap 133 is fastened to the alternative fastening location 53 of the extension plate 51. Both long shoulder straps 103, 133 extend on the back side 10 of the back plate 2. The long shoulder strap 103 is assigned to the left shoulder of the user. The long shoulder strap 133 is assigned to the right shoulder of the user.

The load 9 includes the motor unit, which is arranged in a housing 96. The housing 96 is fastened to the back carrier 1. The back carrier 1 and the load 9 form a unit 32. A grip 19 is integrally formed on the housing 96 of the load 9. The grip 19 is arranged at the upper end of the load 9. In the thickness direction of the extension plate 51, the grip 19 advantageously lies opposite the alternative fastening locations 52, 53. In a spatial direction designated as width direction 60, the extension plate 51 has its greatest extent as width b. The extension plate 51 moreover has a maximum height h measured perpendicularly with respect to the width direction 60 in the direction of a vertical direction 70. The thickness direction 80 lies perpendicular to the vertical direction 70 and to the width direction 60. The grip 19 is arranged at a distance from the extension plate 51 and from the back plate 2 of the back carrier 1. The distance between grip 19 and extension plate 51, or back plate 2, is so great that the opening of the grip 19 is not concealed by the extension plate 51 and the back plate 2. The grip 19 is configured for carrying the unit 32 which includes the back carrier 1 and load 9.

Figure 2:
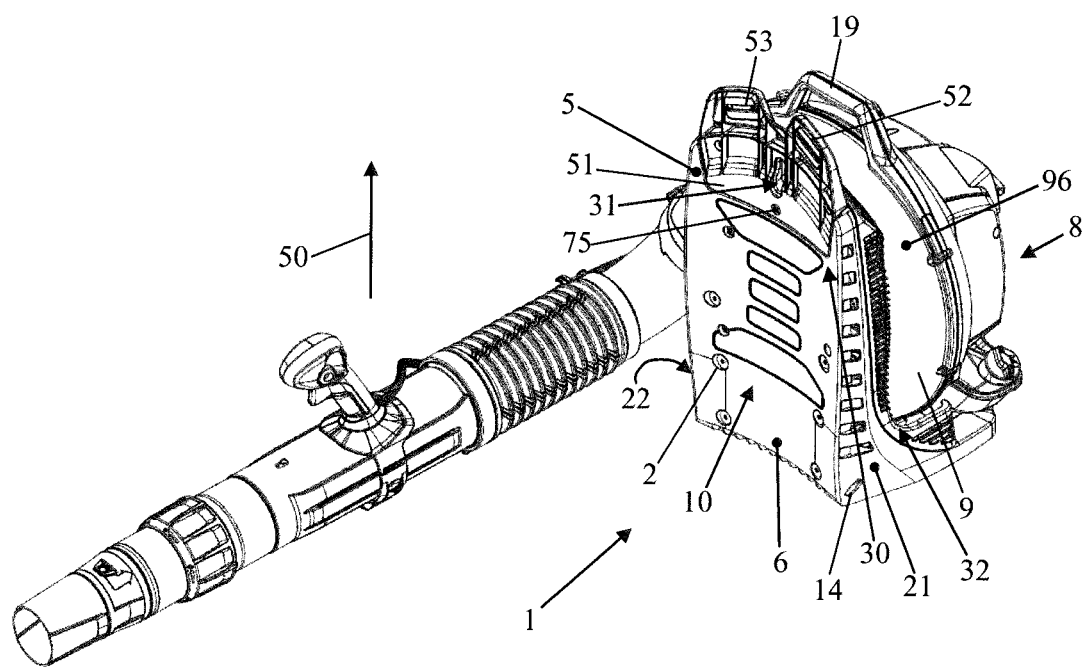
FIG. 2 shows a perspective schematic view according to FIG. 1, with shoulder straps removed.

FIG. 2 shows the back carrier 1 from FIG. 1 without shoulder straps. The extension plate 51 is arranged in the upper end section 5 of the back plate 2 and is stiffly connected to the back plate 2. The extension plate 51 fitted in the recess 15 is non-displaceable with respect to the back plate 2 and is held non-pivotably on the back plate. The extension plate 51 and the back plate 2 form a common back surface 30. The extension plate 51 forms a flush continuation of the back plate 2. The extension plate 51 continues the contour of the back plate 2 without steps or projections in the transition area between extension plate 51 and back plate 2. In the direction perpendicular to the direction of the longitudinal extent 50, and perpendicular to the direction extending in the direction from the lateral surface 21 to the lateral surface 22, the extension plate 51 does not protrude with its entire thickness, in particular does not protrude at all, beyond the back plate 2.

Figure 3:
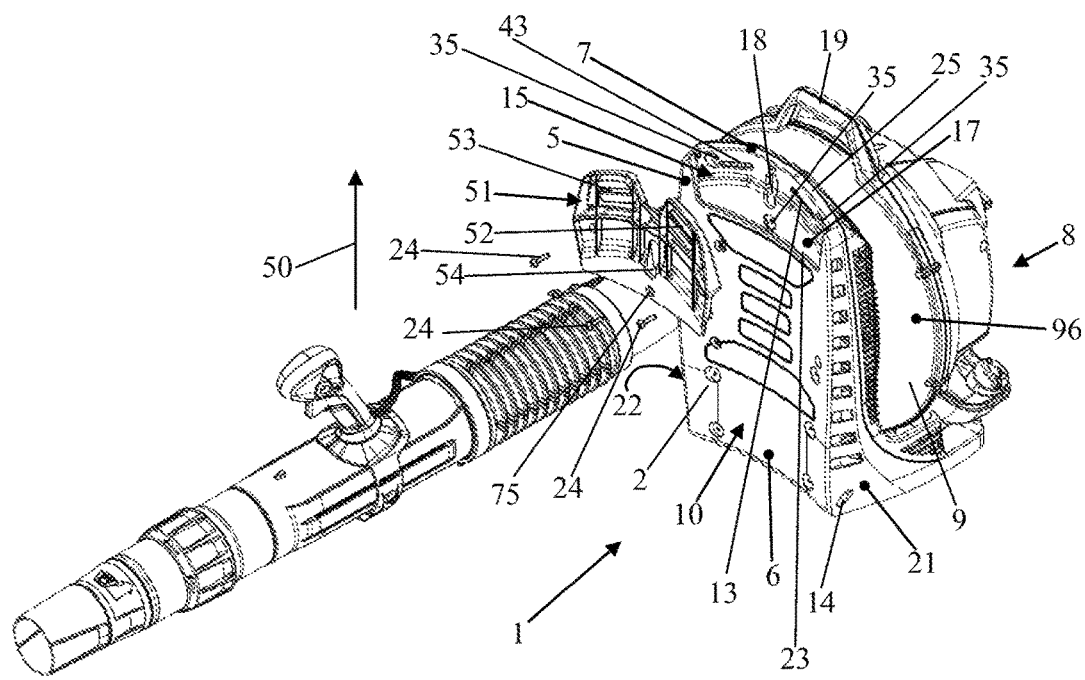
FIG. 3 shows a perspective schematic view according to FIG. 2, with the extension plate in an exploded view.
Figure 4:
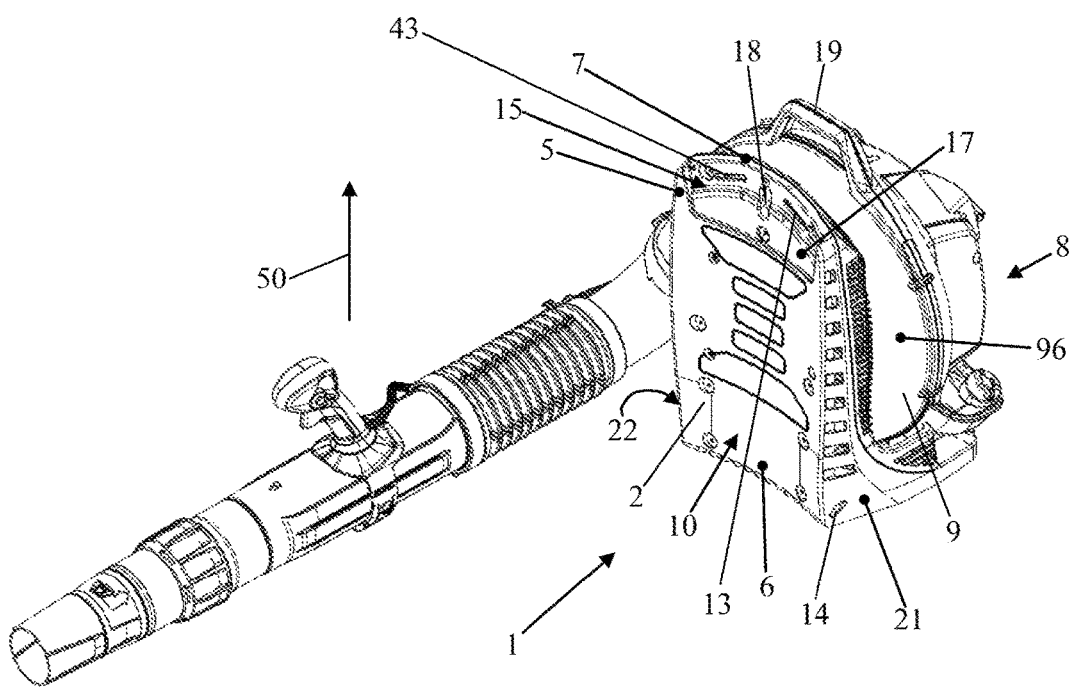
FIG. 4 shows a perspective schematic view according to FIG. 2, with the extension plate removed.

The back plate 2 and the extension plate 51 have a common receptacle 31. The receptacle 31 is provided to receive a hook (not shown). The receptacle 31 is an opening that passes completely through both the extension plate 51 and the back plate 2. As is shown in FIG. 3, the common receptacle 31 is formed by a first opening 18 in the back plate 2 and by a second opening 54 in the extension plate 51. The back plate 2 has a recess 15 for receiving the extension plate 51. The recess 15 is arranged in the area of the upper end section 5 of the back plate. In the direction of the longitudinal extent 50 of the back plate 2, the recess 15 is open toward an upper end 7 of the back plate 2. The recess 15 has a base 17. The first opening 18 is arranged in the base 17 of the recess 15. The first opening 18 extends completely through the back plate 2. As FIGS. 2 and 3 show, when the extension plate 51 is fitted, the first opening 18 overlaps the second through-opening 54 of the extension plate 51. The first opening 18 and the second opening 54 form the common receptacle 31 for a hook.

The recess 15 is delimited on three sides by a protruding edge 23. The protruding edge 23 protrudes in relation to the base 17 of the recess 15. The protruding edge 23 is flush with the back side 10 outside the recess 15. The protruding edge 23 forms a step in the back side 10 of the back plate 2. A depression is formed in the back side 10 by the recess 15, this depression being at least partially delimited by the protruding edge 23. In the direction of the longitudinal extent 50, the recess 15 is not delimited at the upper end 7 of the upper end section 5 of the back plate 2.

As will be seen from FIGS. 2 and 3, the fitted extension plate 51 lies near the protruding edge 23 of the recess 15, with a small gap being formed. The fitted extension plate 51 can also bear on the edge 23 of the recess 15. A stable connection is obtained between the extension plate 51 and the back plate 2 of the back carrier 1. The lateral edges 21, 22 of the protruding edge 23 of the back plate 2 are connected to each other via an upper edge 25 of the back plate 2. The upper edge 25 delimits the back plate 2 in the direction of the longitudinal extent 50 of the back plate 2. The upper end section 5 has the upper edge 25. The recess 15 is open toward the upper edge 25.

As is shown in FIG. 3, the extension plate 51 is fastened in the recess 15 with fastener 24. In the embodiment shown, the fastener 24 is formed by screws, preferably by three screws. The extension plate 51 can also be fitted using another fastener that suppresses a translation and rotation of the extension plate 51 relative to the back plate 2. The connection is advantageously releasable; bonding or riveting may be expedient.

The extension plate 51 is advantageously fitted when a back carrier 1 configured for a carrying system without hip belt 120 is intended to be equipped with a carrying system with hip belt 120. It can initially be thus equipped by the manufacturer of the back carrier 1, or subsequently by the user. If a user wishes to work without hip belt 120, he can remove an extension plate 51 already fitted to the back plate 2, since the back plate 2 itself has an upper fastening location for shoulder straps, onto which fastening location a shoulder strap can be switched from the alternative upper fastening location of the extension plate 51. Thus, the freedom of movement of the user is not impeded by a part of the extension plate 51 that protrudes above the shoulders of a user and that is not in use in this example of an application. Moreover, the weight of the back plate 2 is reduced.

Figure 5:
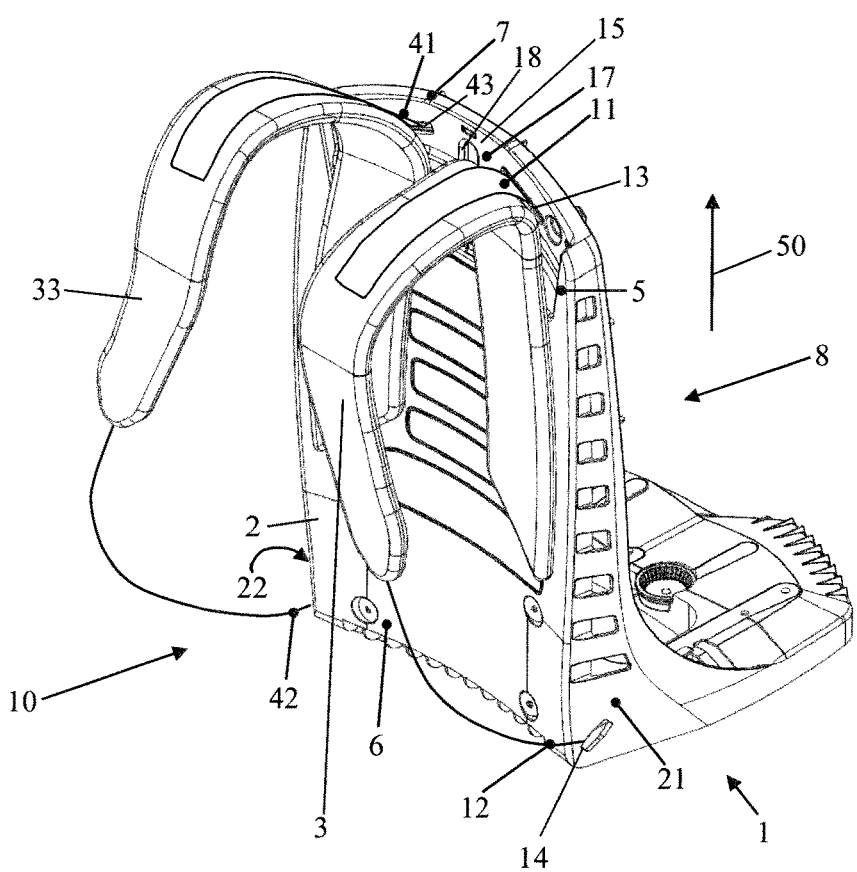
FIG. 5 shows a perspective schematic view of the back carrier according to FIG. 1, without a load, with shoulder straps, and with the extension plate removed.

Upper fastening locations 13, 43 are arranged in the base 17 of the recess 15. As is shown in FIG. 5, a first strap section 11 of a short shoulder strap 3 is fastened to the upper fastening location 13. A first strap section 41 of a short shoulder strap 33 is fastened to the upper fastening location 43. In the embodiments, the short shoulder straps 3, 33 are provided for a use of the back carrier 1 without extension plate 51. However, provision can also be made for the short shoulder straps 3, 33 to be employed both in the use of the back carrier 1 without extension plate 51 and also in the use of the back carrier 1 with extension plate 51. Provision can likewise be made for the long shoulder straps 103, 133 to be employed both in the use of the back carrier 1 with extension plate 51 and also in the use of the back carrier 1 without extension plate 51. The length of the short shoulder straps 3, 33 is adapted to a maximum length L (shown in FIG. 8) of the back plate 2 without extension plate 51. The maximum length L is measured in the direction of the longitudinal extent 50 of the back plate 2 from a lower end 20 of the lower end section 6 of the back plate 2 as far as the upper end 7 of the upper end section 5 of the back plate 2. The length of the long shoulder straps 103, 133 is adapted to a maximum length L2 (shown in FIG. 8) of the back plate 2 and the extension plate 51 together, when the extension plate 51 is fitted in the recess 15. The length L2 is measured in the direction of the longitudinal extent 50 from the lower end 20 of the back plate 2 as far as an upper end 59 of the extension plate 51. The short shoulder strap 3 shown in FIG. 5 is assigned to the left shoulder of a user. The short shoulder strap 33 is assigned to the right shoulder of a user.

Both when the extension plate 51 is fitted in the recess 15 and also when the extension plate 51 is not fitted in the recess 15, the lower end of the back plate 2 designates the same area of the back plate 2. The extension of the back plate 2 is effected upward in the longitudinal direction. The back plate 2 remains unchanged downward in the longitudinal direction, such that a secure stand is ensured also in the extended state. By virtue of the fact that the back plate 2 is extended in the upward direction, the center of gravity of the load that is to be carried does not shift farther up in relation to the back of the user. This enhances the wearing comfort, particularly on uneven ground. Moreover, an operating element extending from the load side to the back side of the back carrier, for example a handle joined to a blower tube of a blower apparatus arranged on the back carrier, is also arranged ergonomically with respect to an arm of the user.

The short shoulder strap 3 has a second strap section 12. The short shoulder strap 33 has a second strap section 42. In the embodiment according to FIG. 5, the second strap section 12 is fastened to the lower fastening location 14 of the back plate 2. In the embodiment according to FIG. 5, the second strap section 42 is fastened to the lower fastening location 44 shown in FIG. 7.

Figure 6:
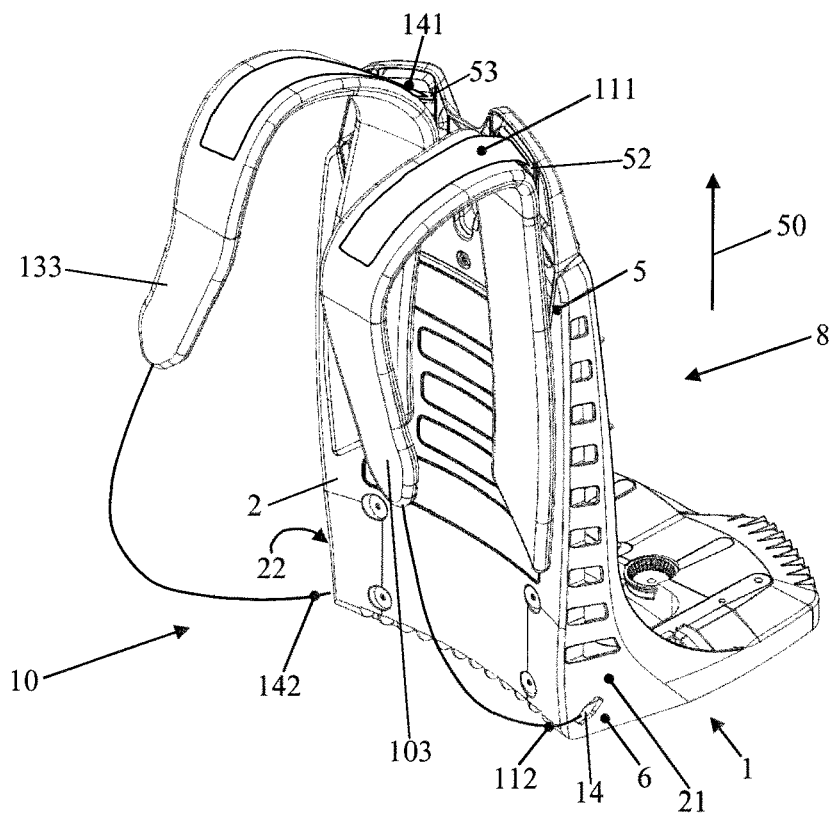
FIG. 6 shows a perspective schematic view of the back carrier according to FIG. 1, without a load, with shoulder straps, and with the extension plate fitted.

As FIGS. 5 and 6 show, the first strap sections of the respective shoulder straps are fastened to the upper fastening location 13, 43 in the area of the recess 15 when the extension plate 51 is removed, and they are fastened to the alternative fastening location 52, 53 on the extension plate 51 when the extension plate 51 is fitted in the recess 15.

FIG. 7 shows the back carrier 1 in a side view perpendicular to the direction of the longitudinal extent 50, looking toward the lateral edge 22 of the back plate 2. Feet 26 are formed on the base plate 4. The back carrier 1 can be parked with the feet 26 of the base plate 4 on an uneven surface. It can be parked with the extension plate 51 fitted and also with the extension plate 51 removed. The feet 26 of the base plate 4 are arranged in a parking plane E. By virtue of the fact that the extension plate 51 can be inserted into the recess 15 at the upper end section 5 of the back plate 2, a back plate 2 lengthened by the extension plate 51 does not protrude from the lower end 20 of the lower end section 6 and does not protrude past the parking plane E. The back carrier 1 can also be parked on a surface when the extension plate 51 is fitted in the back plate 2.

Figure 8:
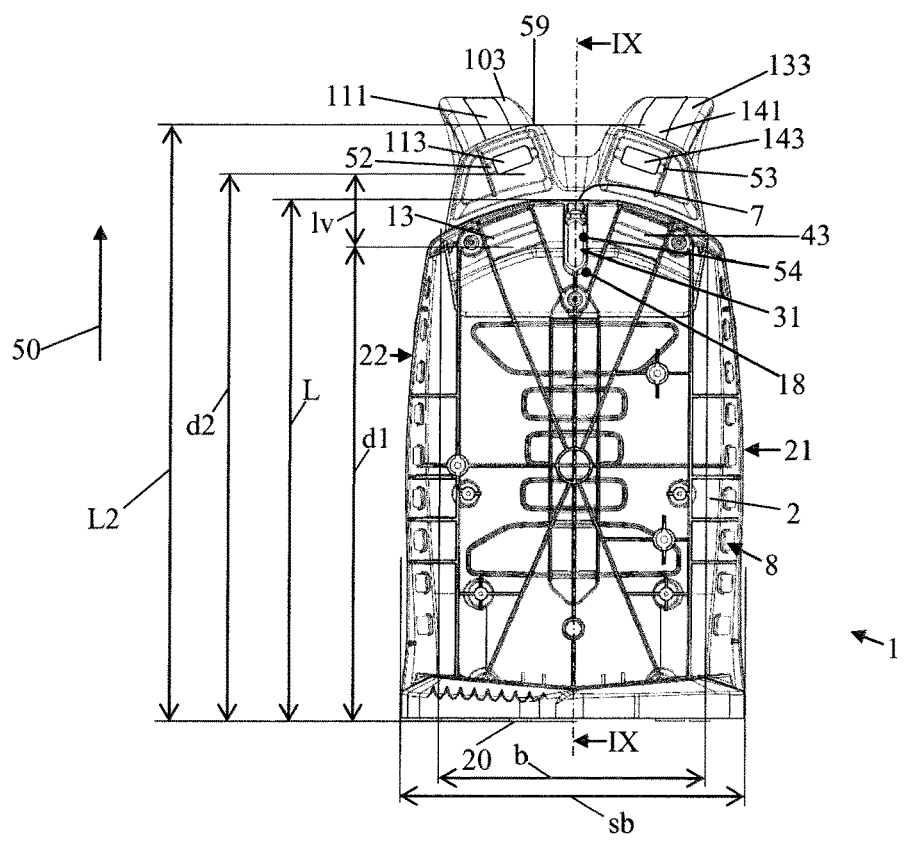
FIG. 8 shows a view of the load side of the back carrier according to FIG. 7.

FIG. 8 shows a side view of the back carrier 1 from a direction perpendicular to the direction of the longitudinal extent 50 of the back plate 2 and in the thickness direction of the load side 8. The extension plate 51 is fitted in the recess 15 (not visible in FIG. 8). The extension plate 51 protrudes above the upper end 7 of the back plate 2 in the direction of the longitudinal extent 50 of the back plate 2. The maximum length L2 of the back plate 2 with the extension plate 51 is greater than the maximum length L of the back plate 2 on its own. In the embodiment according to FIG. 8, the maximum length L2 is at least 110% of the maximum length L.

As will be seen from FIGS. 2 and 3, the fitted extension plate 51 conceals the upper fastening locations 13, 43 arranged in the base 17 of the recess 15, on the back side 10 of the back plate 2. As is shown in FIG. 8, with the extension plate 51 fitted, the upper fastening locations 13, 43 on the load side 8 of the back plate 2 are not concealed by components of the back carrier 1 itself.

When the back carrier 1 is used with a hip belt 120, the hip belt 120 is arranged in the lower end section of the back plate 2. When the back carrier 1 is used without a hip belt 120, padding is advantageously provided in the lower end section. With and without a fitted extension plate 51, the back carrier 1 bears with the same lower end section of the back plate 2 directly or indirectly on the user.

The upper fastening locations 13, 43 of the back plate 2 have a first distance d1, measured in the direction of the longitudinal extent 50, from the lower end 20 of the lower end section 6 of the back plate 2. The first distance d1 is the shortest distance of the upper fastening locations 13, 43 from the lower end 20. With the extension plate 51 inserted in the recess 15, the alternative fastening locations 52, 53 of the extension plate 51 have a second distance d2, measured in the direction of the longitudinal extent 50 of the back plate 2, from the lower end 20 of the lower end section 6 of the back plate 2. The second distance d2 is the shortest distance of the alternative fastening locations 52, 53 from the lower end 20. The second distance d2 is greater than the first distance d1. The upper fastening locations 13, 43 of the back plate 2 lie below the alternative fastening locations 52, 53. The second strap sections 12, 42 of the short shoulder straps 3, 33 and also the second strap sections 112, 142 of the long shoulder straps 103, 133 are fastened to the same lower fastening locations 14, 44 (shown in FIGS. 1 and 7) of the back plate 2. In the embodiment, the position of the lower fastening locations on the back plate 2 for the shoulder straps is the same, independently of a use of the back carrier 1 with and without a fitted extension plate 51. In this way, with an extension plate 51 fitted, the distance between the fastening locations assigned to one shoulder strap also increases. The lower fastening locations can also deviate from each other. In this way, the back surface of the back carrier 1 on the back of a user is larger with the extension plate 51 fitted than it is without extension plate 51. By fitting the extension plate 51, it is possible to adapt the back carrier 1 to another height of a user. The padding can be fastened using the same fastening points that are used to fasten the hip belt 120. The number of fastening points in the back plate 2 is therefore reduced and incorrect fitting is ruled out. The hip belt 120 can advantageously be partially formed by the padding itself.

In the embodiment according to FIG. 8, the first strap section 111 of the long shoulder strap 103 is fastened in the alternative fastening location 52 of the extension plate 51. Analogously to this, the first strap section 141 of the long shoulder strap 133 is fastened in the alternative fastening location 53 of the extension plate 51. The alternative fastening locations 52, 53 of the extension plate 51 and the upper fastening locations 13, 43 of the back plate 2 are slit-shaped. The slits of the fastening locations 13, 43, 113, 143 each have a length and a width. To fasten the first strap section 111 and the shoulder strap 103, the fastening element 113 of the first strap section 111 of the long shoulder strap 103 is pushed through the slit-shaped alternative fastening location 52. The fastening element 113 is arranged at the end of the first strap section 111 of the long shoulder strap 103. The fastening element 113 has the shape of a substantially rectangular plate with a length, a width and a thickness. The length is greater than the width, and the width and the length are greater than the thickness. The thickness of the fastening element 113 is smaller than the width of the slit-shaped alternative fastening location 52. The length of the plate-shaped fastening element 113 is smaller than the length of the slit-shaped alternative fastening location 52. The width of the plate-shaped fastening element 113 is greater than the width of the slit-shaped alternative fastening location 52. In this way, the plate-shaped fastening element 113 can be pushed with its narrow side through the slit-shaped fastening location 52 and then turned in such a way that the broad side of the plate-shaped fastening element 113 does not pass through the slit-shaped alternative fastening location 52. Analogously, a plate-shaped fastening element 143 is mounted at the end of the first strap section 141 of the long shoulder strap 133. The plate-shaped fastening element 143 is configured analogously to the plate-shaped fastening element 113. Likewise, the slit-shaped alternative fastening location 53 is configured analogously to the slit-shaped alternative fastening location 52. The fastening (not shown in the drawing) of the first strap sections 11, 41 of the short shoulder straps 3, 33 in the upper fastening locations 13, 43 also takes place analogously to the fastening of the first strap sections 113, 43 of the long strap sections 111, 133 in the alternative fastening locations 52, 53 of the extension plate 51.

The slit-shaped fastening locations 43 and 53 and the slit-shaped fastening locations 13 and 52 are each oriented, with respect to their longitudinal extent, at the same angle to the direction of the longitudinal extent 50. When the extension plate 51 is fitted, the two upper fastening locations 13, 43 in the back plate 2 for the shoulder straps are replaced by two alternative fastening locations 52, 53. Compared to the upper fastening locations 13, 43, the alternative fastening locations 52, 53 are displaced upward by a displacement length v1 measured in the direction of the longitudinal extent 50 of the back plate 2. In the embodiments, the displacement length v1 is at least 5 cm. The displacement length v1 corresponds to the difference between the distance d2 and the distance d1. The slit-shaped fastening locations 43 and 53 and the slit-shaped fastening locations 13 and 52 are in each case at a fixed distance to each other.

The back plate 2 has a lateral width b measured perpendicularly with respect to the longitudinal extent 50 of the back plate 2 from the lateral edge 21 of the back plate 2 to the lateral edge 22 of the back plate 2. The extension plate 51 has a width b shown in FIGS. 8 and 13. In the fitted state of the extension plate 51 shown in FIG. 8, the width b is measured perpendicularly with respect to the longitudinal extent 50 of the back plate 2 and in the direction from the lateral edge 21 of the back plate 2 to the lateral edge 22 of the back plate 2. The width b of the extension plate 51 is advantageously at least two thirds of the lateral width sb of the back plate 2.

Figure 9:
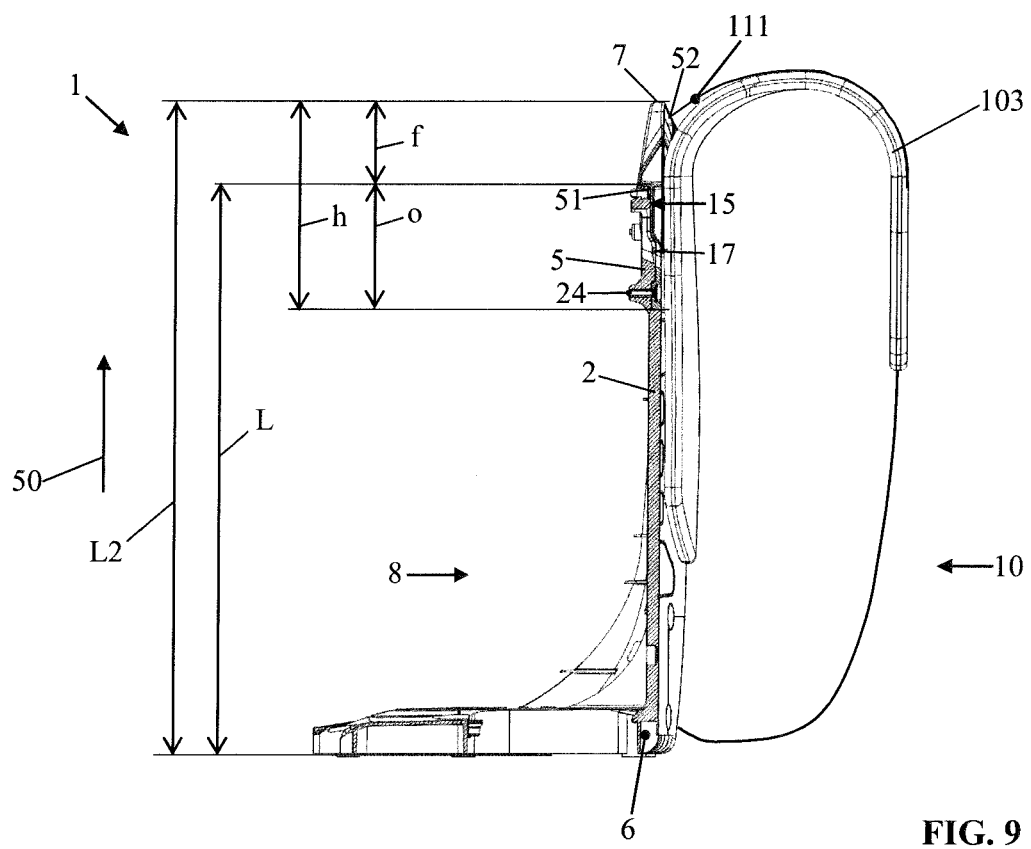
FIG. 9 shows a cross section along the line IX-IX in FIG. 8.
Figure 9A:
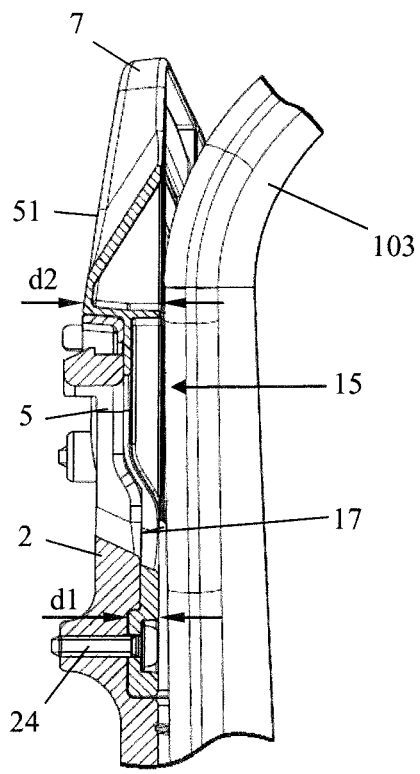
FIG. 9A shows an enlarged view of the cross section according to FIG. 9 in the area of the extension plate.
Figure 13:
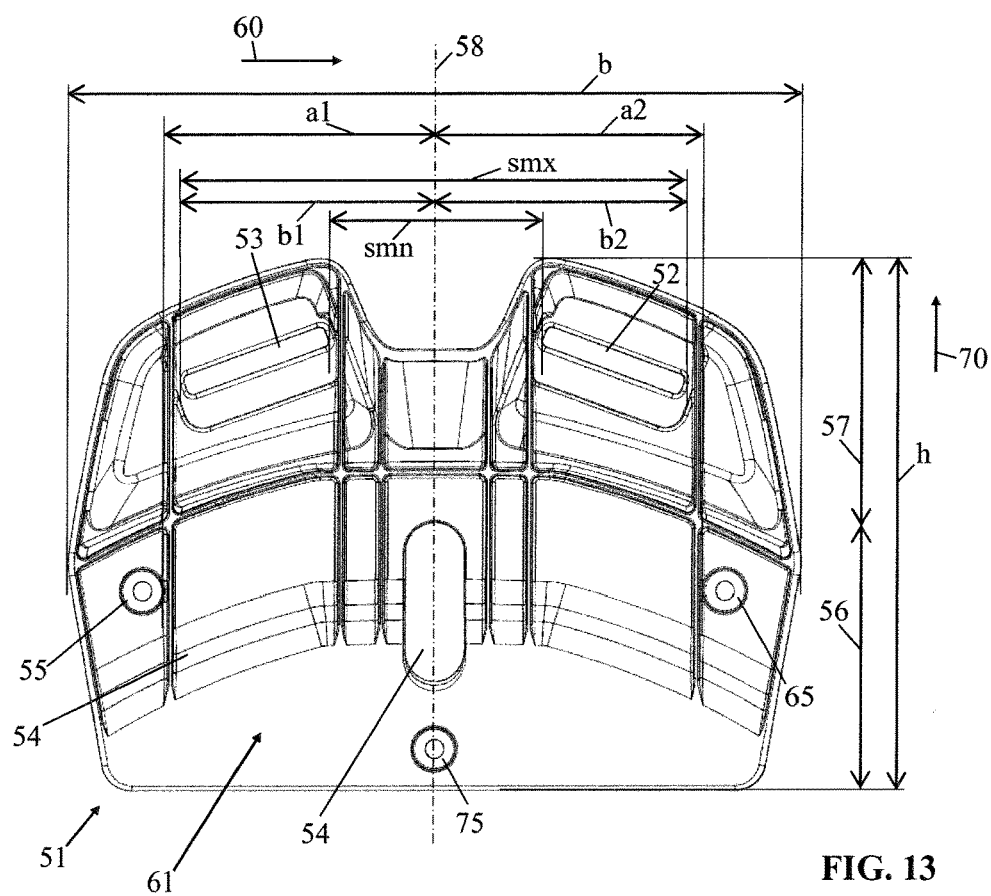
FIG. 13 shows a view of the extension plate according to FIG. 12 in arrow direction XIII.

FIG. 9 shows a cross section through the longitudinal center axis of the back carrier 1 along the section line IX-IX in FIG. 8. As is also shown in FIG. 13, the extension plate 51 has a maximum height h. With the extension plate 51 fitted in the recess 15 of the back plate 2, the maximum height h, as shown in FIG. 9, is measured in the direction of the longitudinal extent 50 of the back plate 2. The extension plate 51 and the back plate 2 overlap each other in the direction of the longitudinal extent 50 of the back plate 2. The extension plate 51 and the back plate 2 have a common overlap length o. The overlap length o is measured in the direction of the longitudinal extent 50 of the back plate 2. The overlap length o is a partial length of the maximum height h of the extension plate 51. The extension plate 51 bears with at least a quarter of its maximum height h on the back plate 2. Accordingly, the overlap length o of the extension plate 51 and of the back plate 2 is at least a quarter of the maximum height h of the extension plate 51. In the embodiment according to FIG. 9, the overlap length o is greater than half the maximum height h.

In the fitted state, the extension plate 51 has a free length f. The free length f is measured in the direction of the longitudinal extent 50 of the back plate 2. The free length f is a partial length of the maximum height h of the extension plate 51. The extension plate 51 protrudes above the back plate 2 by the free length f. The free length f corresponds to the difference between the maximum height h and the overlap length o. The free height f corresponds to the difference between the maximum length L2 and the maximum length L. In the embodiment according to FIG. 9, the free length f is at least a quarter of the maximum height h of the extension plate 51.

Figure 10:
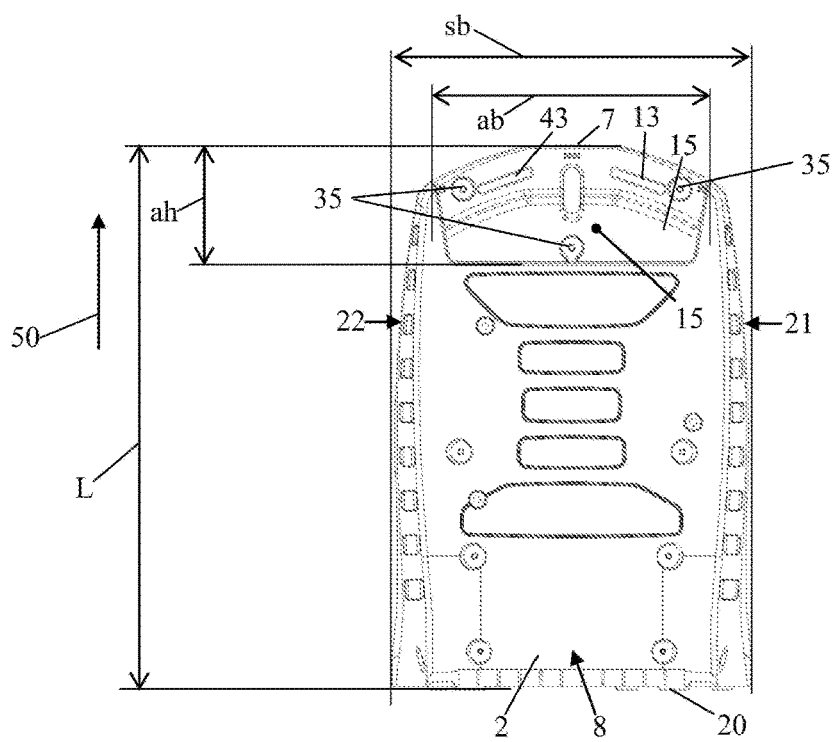
FIG. 10 shows a view of a back side of the back plate of a back carrier according to FIG. 4, without shoulder straps.

FIG. 10 shows the plan view of the back side 8 of the back plate 2, from a direction perpendicular to the direction of the longitudinal extent 50 of the back plate 2, when the extension plate 51 is removed. The recess 15 has a recess width ab measured perpendicularly with respect to the longitudinal extent 50 of the back plate 2 in a direction from the lateral edge 21 of the back plate 2 to the lateral edge 22 of the back plate 2. The recess width ab is at least two thirds of the lateral width sb of the back plate 2 measured in the same direction. The recess 15 has a recess height ah measured in the direction of the longitudinal extent 50 of the back plate 2. The recess height ah is at least as great as the overlap length o of the extension plate 51 and of the back plate 2. The recess width ab is at least as great as the width b of the extension plate 51. It is thereby ensured that the extension plate 51 fits into the recess 15. In the embodiments, the recess width ab and the recess height ah are only marginally greater than the overlap length o and the maximum height h, respectively. In this way, the extension plate 51 can be fixed in a secure and stable manner in the recess 15 of the back plate 2.

Figure 11:
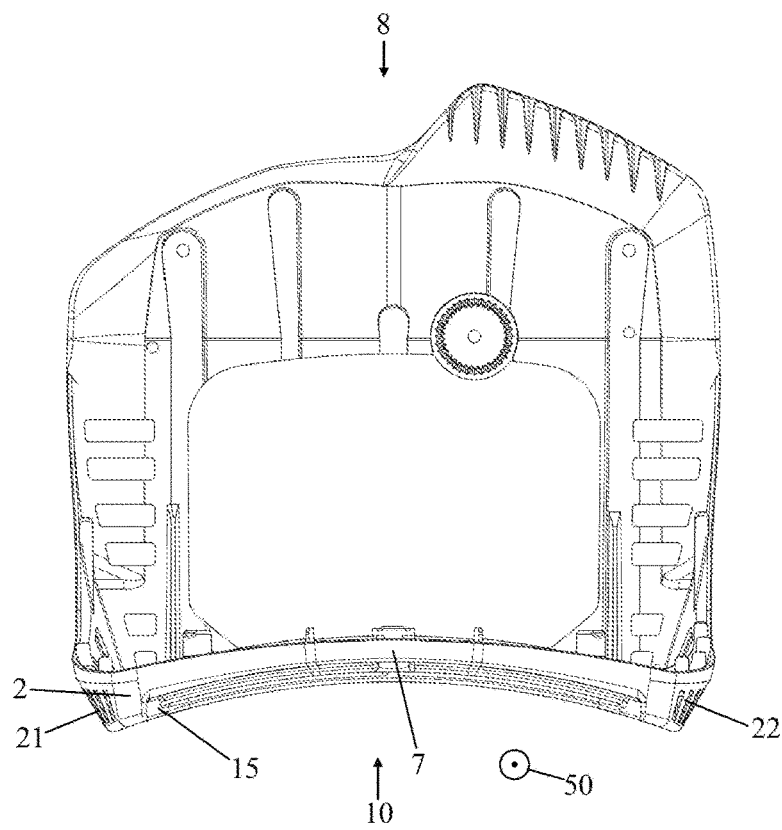
FIG. 11 shows a view of the back carrier according to FIG. 10 from above.

FIG. 11 shows a plan view of the upper end 7 of the back plate 2, counter to the direction of the longitudinal extent 50 of the back plate 2. The back plate 2 has a curved profile. The back plate 2 is curved about the direction of the longitudinal extent 50 of the back plate 2. The back plate 2 is bent with its lateral edges 22, 23 toward the back side 10 of the back plate 2. In this way, the shape of the back plate 2 is at least partially adapted to the shape of the back of a user.

Figure 12:
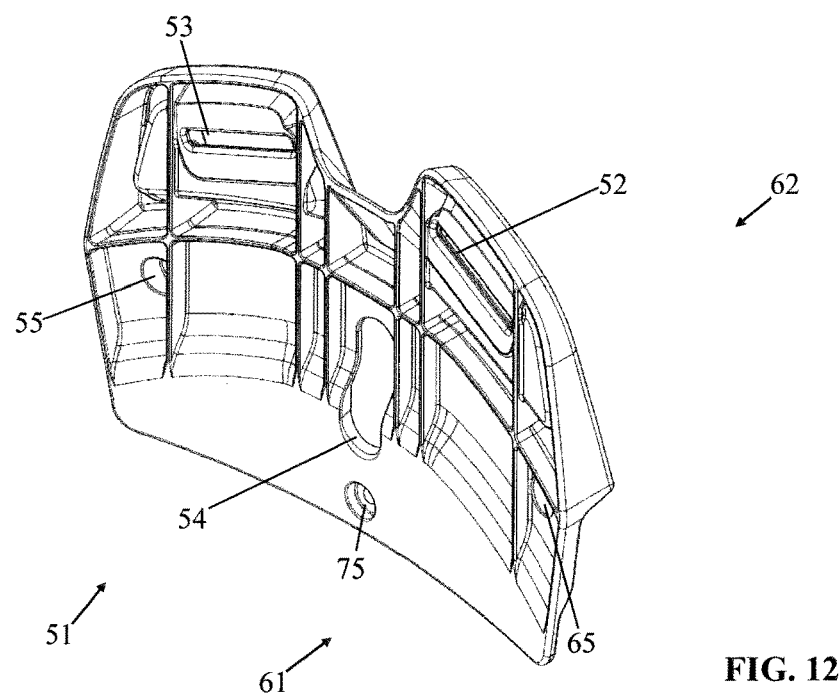
FIG. 12 shows a perspective, schematic view of an extension plate for use with a back plate of a back carrier according to FIGS. 1 to 11.

FIG. 12 shows a perspective view of the extension plate 51. The extension plate 51 has a first attachment element 55, a second attachment element 65 and a third attachment element 75. The attachment elements 55, 65, 75 are configured substantially as through-openings in the extension plate 51. In particular, the edges of these through-openings serve as attachment elements 55, 65, 75 when the extension plate 51 is fastened on the back plate 2. As is shown in FIGS. 2 and 3, in order to fasten the extension plate 51 in the recess 15 of the back plate 2, fastener 24 formed as screws are pushed through the openings 35 of the extension plate 51 and, together with the attachment elements 55, 65, 75, have the effect of fastening the extension plate 51 on the back plate 2. The extension plate 51 has a back side 61 and a load side 62. In the fitted state of the extension plate 51, the back side 61 of the extension plate 51 is arranged on the back side 10 of the back plate 2, and the load side 62 of the extension plate 51 is arranged on the load side 8 of the back plate 2.

FIG. 13 shows a plan view of the back side 61 of the extension plate 51. The extension plate 51 has at least two alternative fastening locations 52, 53. A maximum distance smx between the two fastening locations 52, 53, measured in the direction of the width b of the extension plate 51, corresponds to at least two thirds of the width b of the extension plate 51. The maximum distance smx corresponds to the greatest distance that points of the alternative fastening location 52, configured as a slit-shaped through-opening, have from points of the alternative fastening location 53 configured as a slit-shaped through-opening. The maximum distance smx between the two fastening locations 52, 53 is at least 15 cm. The alternative fastening location 52 has a minimum distance smn from the alternative fastening location 53. In the embodiment according to FIG. 13, the minimum distance smn is less than half of the maximum distance smx. The minimum distance smn is greater than one quarter of the width b.

The extension plate 51 is rigid and formed in one piece. The width b of the extension plate 51 extends in a spatial direction designated as width direction 60. The width b is the greatest extent of the extension plate 51. The maximum height h is measured in a vertical direction 70 measured perpendicularly with respect to the width direction 60. The width b of the extension plate 51 is greater than the height h of the extension plate 51.

The vertical direction 70 extends perpendicularly with respect to the width direction 60 and runs from the attachment elements 55, 65, 75 to the fastening locations 52, 53. The three attachment elements 55, 65, 75 are arranged in a lower half 56 of the maximum height h. The fastening locations 52, 53 are arranged in an upper half 57 of the height h. The extension plate 51 has a center plane 58, which extends perpendicularly with respect to the width direction 60. In the embodiment according to FIG. 13, the center plane 58 is a plane of symmetry of the extension plate 51. The first attachment element 55 has a minimum distance a1 from the center plane 58. The second attachment element has a minimum distance a2 from the center plane 58. In the embodiment, the minimum distance a1 is the same size as the minimum distance a2. The alternative fastening location 53 has a maximum distance b1 from the center plane 58. The alternative fastening location 52 has a maximum distance b2 from the center plane 58. In the embodiment, the maximum distance b1 is the same size as the maximum distance b2. The sum of the maximum distances b1 and b2 corresponds to the maximum distance smx between the two fastening elements 52, 53. The minimum distance a1 of the first attachment element 55 from the center plane 58 is greater than the maximum distance b1 of the alternative fastening location 53 from the center plane 58. The minimum distance a2 of the second attachment element 65 from the center plane 58 is greater than the maximum distance b2 of the alternative fastening location 52 from the center plane 58. Since the distances a1 and a2 are greater than the distances b1 and b2, respectively, the extension plate 51 can be fastened in a stable manner to a back plate of a back carrier, and, at the same time, shoulder straps fastened in the alternative fastening locations 52, 53 are kept stable.

Figure 14:
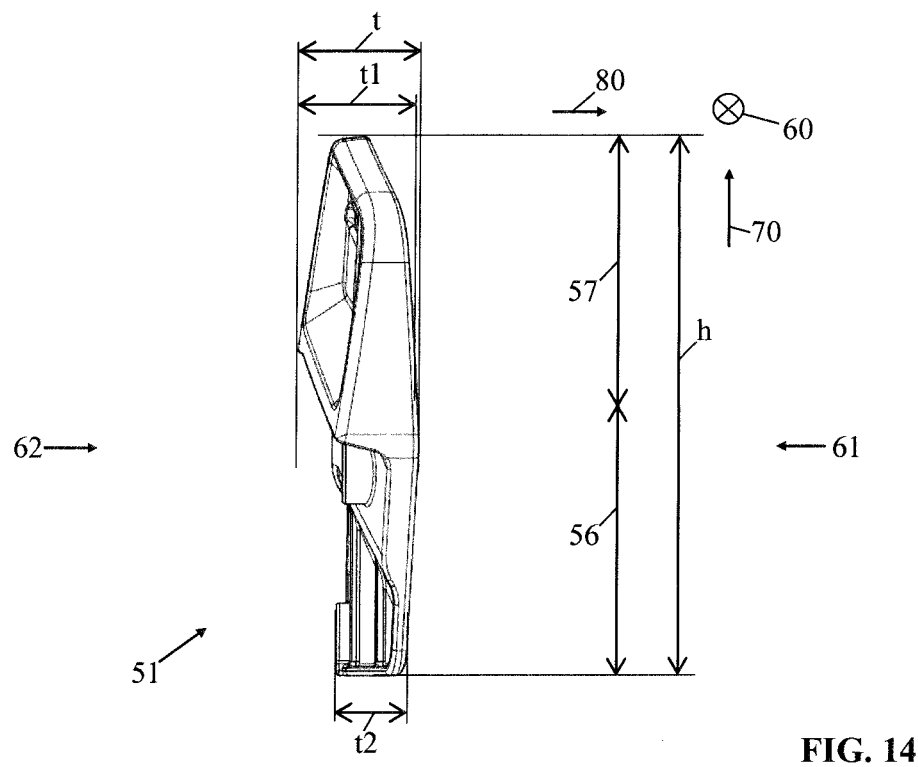
FIG. 14 shows a side view of the extension plate according to FIG. 12.

FIG. 14 shows a side view of the extension plate 51 from the direction of the width direction 60 of the extension plate 51. The extension plate 51 has a thickness direction 80. The thickness direction 80 extends perpendicularly with respect to the vertical direction 70 and perpendicularly with respect to the width direction 60. The thickness direction 80 extends from the load side 62 to the back side 61 of the extension plate 51. The extension plate 51 has a maximum thickness t measured in the thickness direction 80. The height h is greater than the maximum thickness t.

The extension plate 51 has a first thickness t1 in the upper half. The extension plate 51 has a second thickness t2 in the lower half 56. The first thickness t1 is greater than the second thickness t2. The extension plate 51 can thus be inserted into a recess of the back plate 2 of a back carrier 1, wherein the thicker part of the upper half 57 can protrude above the back plate 2 of the back carrier 1 and continues the back plate 2 with the same thickness that the back plate 2 has at this location outside the recess 15. The extension plate 51 bears with its thicker part on the upper edge of the back plate 2. The part of the extension plate 51 located in the recess 15 has a smaller extent d1 in the thickness direction than the extent d2 of the part of the extension plate 51 arranged outside the recess 15.

Figure 15:
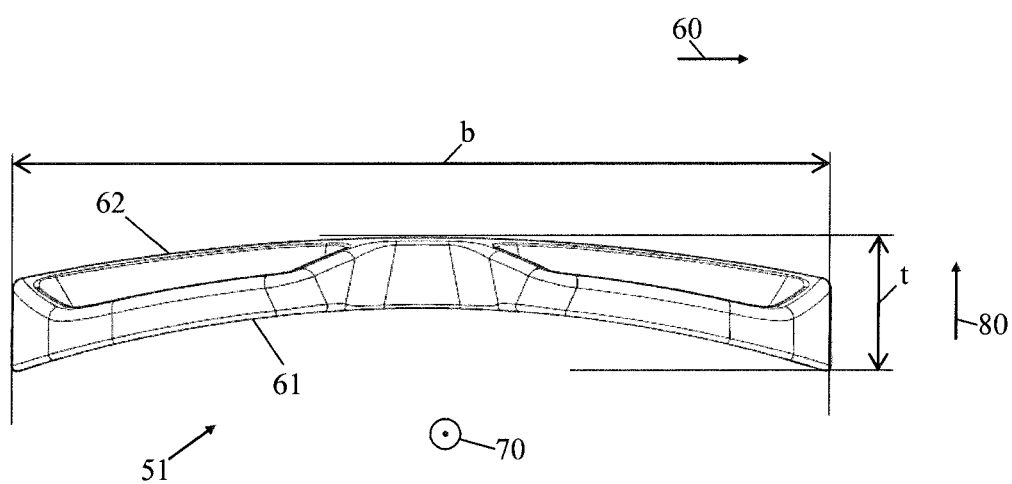
FIG. 15 shows a plan view of the extension plate according to FIG. 12.

FIG. 15 shows a view of the top of the extension plate 51 counter to the vertical direction 70. The extension plate 51 is curved about the vertical direction 70 toward the back side 61. The extension plate 51 is thus adapted at least partially to the shape of the back of a user. The extension plate 51 can thus continue the shape of the back side of the back plate of a back carrier with the same curvature.

Figure 16:
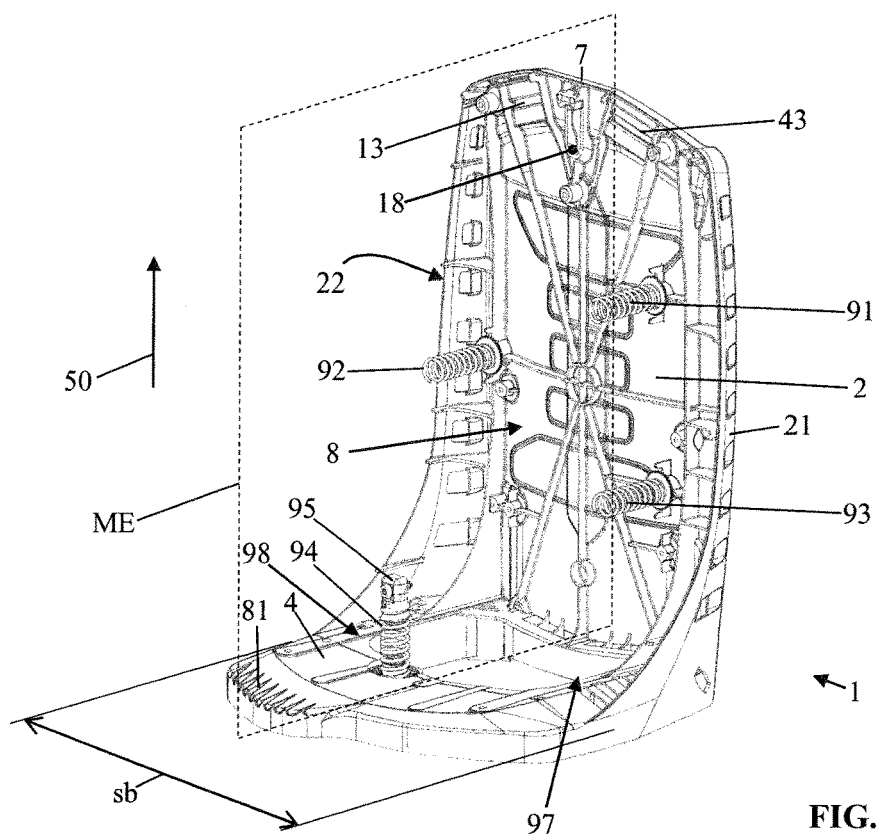
FIG. 16 shows a perspective schematic view of the load side of a back carrier according to FIGS. 1 to 11, with holders configured as springs for fitting a work apparatus.

FIG. 16 shows a further embodiment of a back carrier 1 in a perspective view looking toward the load side 8 of the back carrier 1. To accommodate and connect the load 9 (not shown in FIG. 16), three antivibration elements are arranged as holders on the load side 8 and provided in the form of horizontal springs 91, 92, 93 along with a vertical spring 94. The vertical spring 94 extends in the direction of the longitudinal extent 50 of the back plate 2 of the back carrier 1 and is fastened with its lower end to the side of the base plate 4 facing toward the load.

Figure 17:
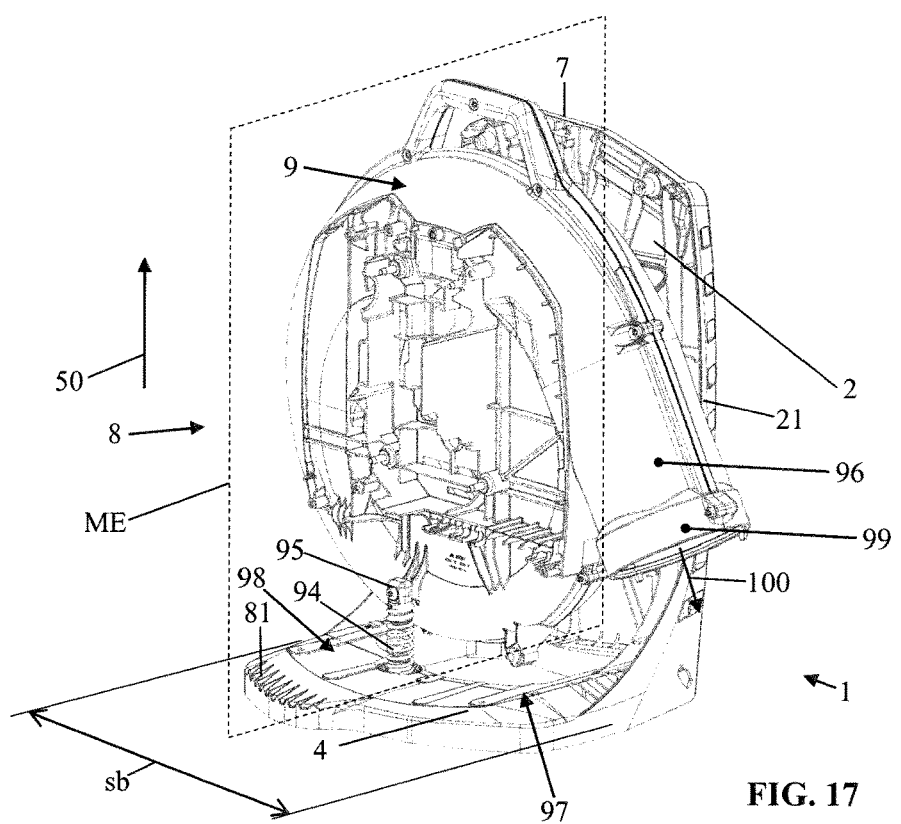
FIG. 17 shows a perspective view according to FIG. 16, with a work apparatus shown in partial cross section.
Figure 18:
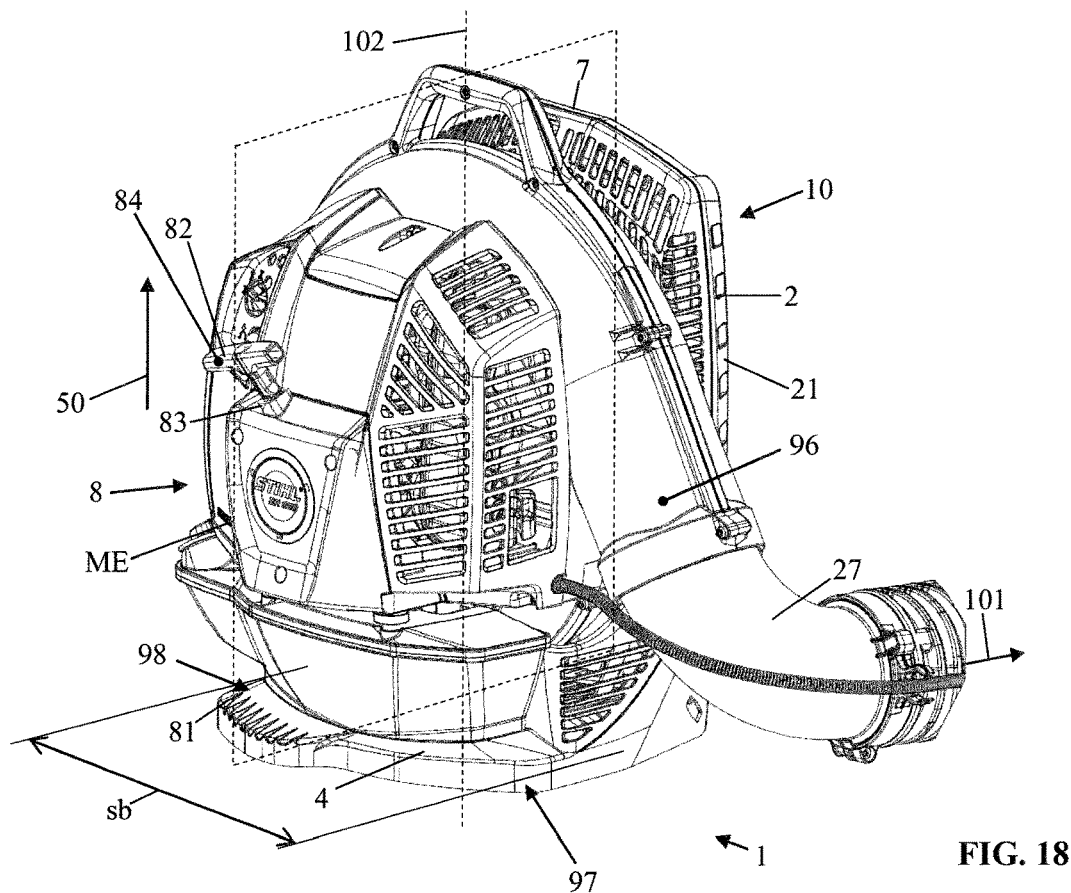
FIG. 18 shows a perspective view according to FIG. 16 with the work apparatus fitted; and, FIG. 19 shows a back carrier according to FIG. 1 with shoulder straps and a hip belt.

The back carrier 1 has a center plane ME indicated by a rectangular broken line in FIGS. 16 to 18. The center plane ME extends perpendicularly with respect to the direction of the lateral width sb, which runs between the lateral edge 21 and the lateral edge 22. Seen in the direction of the lateral width sb, the center plane ME divides the back carrier 1 into a first half 97 and a second half 98. The two halves 97 and 98 are configured differently. The first half 97 is assigned to the lateral edge 21 and the second half 98 is assigned to the lateral edge 22. The vertical spring 94 is arranged in the second half 98 of the back carrier 1.

As is shown in FIG. 16, the antivibration elements configured as holders in the form of horizontal springs 91, 92, 93 are fastened with one end to the back plate 2 of the back carrier 1. The horizontal springs 91, 92, 93 extend in a direction perpendicular to the direction of the longitudinal extent 50 and in a direction perpendicular to the direction of the lateral width sb. The two horizontal springs 91, 93 are arranged in the first half 97 of the back carrier 1. The horizontal spring 92 is arranged in the second half 98 of the back carrier 1.

The arrangement of the antivibration elements configured as holders in the form of horizontal springs 91, 92, 93 on the back plate 2 is asymmetrical with respect to the center plane thereof. The arrangement of the antivibration elements on the base plate 4 is asymmetrical with respect to the center plane thereof. The number of antivibration elements per half is the same.

As is shown in FIG. 17, the housing 96 of the load 9 configured as a blower apparatus has an outflow opening 99. The outflow opening 99 is arranged on the side of the center plane ME of the back plate 2 on which the first half 97 of the back carrier 1 is located. At the outflow opening 99, the blowing air generated by the motor unit arranged in the housing 96 passes into the blower tube 27 shown in FIG. 18. At the outflow opening 99, the blowing air flows in an outflow direction 100. The outflow direction 100 is oriented downward, away from the upper end 7 of the back plate 2. As a result of the blowing air flowing out at the outflow opening 99, a torque acts on the housing 96. In the first half 97, the torque substantially generates a force on the housing 96 that is oriented upward, in the direction of the upper end 7 of the back plate 2. In the second half 98, the force acting on the housing 96 as a result of the torque is oriented downward, in the direction of the base plate 4. The asymmetrical arrangement of the vertical spring 94 on the base plate 4 is adapted to this force distribution and takes up the forces in an optimal manner. As is shown in FIG. 17, the upper end of the vertical spring 94 facing toward the load is connected to the housing 96 of the load 9 via a connecting element 95.

As is shown in FIG. 18, the blowing air in the blower tube 27 is blown principally in a blow direction 101. When the blower tube 27 is used in the usual way, the blow direction 101 is oriented transversely with respect to the longitudinal extent 50 and transversely with respect to the direction of the lateral width sb, in a direction away from the back side 10 of the back plate 2. As a result of the blowing air flowing in blow direction 101, a torque acts on the housing 96 of the load 9 about a rotational axis 102 that extends in the center plane ME in the direction of the longitudinal extent 50. This torque is substantially taken up by the horizontal springs 91, 92, 93 arranged on the back plate 2 asymmetrically with respect to the center plane thereof. By virtue of the fact that the antivibration elements on the base plate 4 and on the back plate 2 are arranged asymmetrically with respect to the center plane thereof, the vibration generated by the torque and acting on the housing 96 about the rotational axis 102 is absorbed in a uniform manner.

FIG. 18 shows the complete housing 96 of the blower apparatus. The blower apparatus has a pull-cord starter 82 for starting the motor of the motor unit. The pull-cord starter 82 is operated via a grip 84. The grip 84 protrudes from the housing 96 through an opening 83 in the housing 96. The opening 83 is arranged on the side of the center plane ME in which the second half 98 of the back carrier 1 is located. The opening 83 is arranged on the same half as the single antivibration element arranged on the base plate 4. Tilting about this antivibration element during starting is thus avoided.

To start it, the motor unit fastened to the back carrier 1 is parked on ground that is as even as possible. The unit 32 has a back carrier 1 and a load 9. The load 9, which includes the motor unit, stands on the ground via the side of the base plate 4 facing away from the load. To be able to draw up the pull-cord starter 82 via the grip 84, the unit 32 has to be held on the ground. A ledge 81 is provided for this purpose. The ledge 81 is formed on the base plate 4 of the back carrier 1. The ledge 81 protrudes from the housing 96 in a direction perpendicular to the direction of the longitudinal extent 50 and perpendicular to the direction of the lateral width sb. The opening 83 of the housing 96 for the pull-cord starter 82 is arranged directly above the ledge 81 in the direction of the longitudinal extent 50. In this way, the forces that are applied to the unit 32 when the pull-cord starter 82 is pulled out can be very effectively absorbed and compensated by the user placing a foot on the ledge 81.

Figure 19:
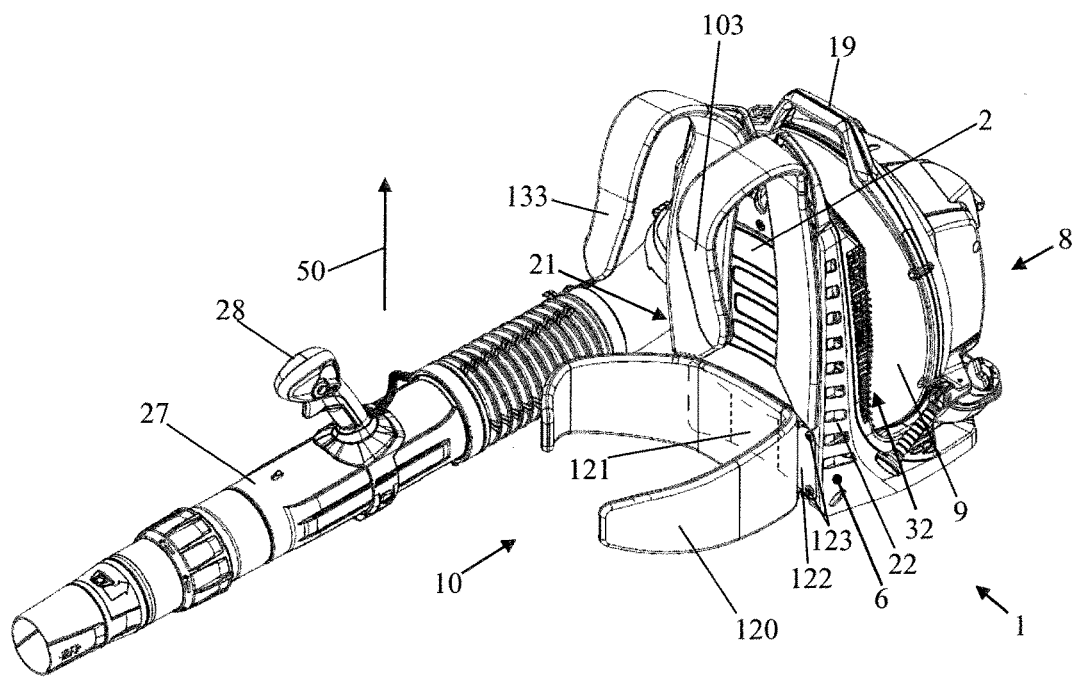

FIG. 19 shows a schematic perspective view of the unit 32, looking toward the back side 10 of the back plate 2 of the back carrier 1. In the lower end section 6 of the back plate 2, a hip belt 120 is arranged on the back side 10. On its side facing toward the back plate 2, the hip belt 120 has a pocket 121. The pocket 121 is concealed in FIG. 19 and is indicated by broken lines. The pocket 121 has two openings lying opposite each other. One of the two openings opens toward the lateral edge 21, the other toward the lateral edge 22 of the back plate 2. A respective end of a fastening plate 122 protrudes from the pocket 121 through each of the two openings. The fastening plate 122 is partially concealed in FIG. 19 and is therefore indicated in part by broken lines. The fastening plate 122 has a longitudinal direction, which extends from the lateral edge 21 to the lateral edge 22. At the center of its longitudinal extent, the fastening plate 122 is tapered in the direction of the longitudinal extent 50. At the ends of the longitudinal extent of the fastening plate 122, the fastening plate 122 is connected by fastening elements 123 to the lower end section 6 of the back plate 2 of the back carrier 1. In the embodiment according to FIG. 19, the fastening elements 123 are screws. The fastening elements are concealed by the hip belt 120. Thus, when wearing the back carrier 1, the user does not come into direct contact with the fastening elements 123 of the hip belt 120. The hip belt 120 is arranged between user and fastening elements 123. This enhances the wearing comfort.

It is understood that the foregoing description is that of the preferred embodiments of the invention and that various changes and modifications may be made thereto without departing from the spirit and scope of the invention as defined in the appended claims.

What is claimed is:

1. A back carrier comprising:
a back plate defining a longitudinal extent;
at least two shoulder straps;
said back plate having, in the direction of said longitudinal extent, an upper end section and a lower end section;
said back plate having an upper end;
said upper end section extending up to said upper end;
said back plate having a load side configured to face a load to be carried and a back side configured to face a back of a user;
said at least two shoulder straps extending on said back side of said back plate and each having a first strap section and a second strap section;
said at least two shoulder straps being configured to be fastened with said first strap section at respective upper fastening locations in said upper end section;
said at least two shoulder straps being configured to be fastened with said second strap section at a respective lower fastening location in said lower end section;
said back plate defining a recess configured to receive an extension plate;
said recess being open to said upper end of said back plate in the direction of said longitudinal extent;
said recess having a base;
said upper fastening locations being arranged in said base of said recess;
said back plate having at least two attachment locations for connecting to attachment elements of the extension plate;
said at least two attachment locations being arranged in said base of said recess;
said at least two attachment locations defining a minimal mutual distance between said at least two attachment locations;
said upper fastening locations defining a maximal mutual distance between said upper fastening locations; and,
said minimal mutual distance of said two attachment locations being greater than said maximal mutual distance of said upper fastening locations.

2. The back carrier of claim 1, wherein:
said recess defines a recess region;
said upper fastening location is disposed in said recess region; and,
said first strap section is configured to fasten to an alternative fastening location on the extension plate when the extension plate is mounted in said recess.

3. The back carrier of claim 2, wherein:
said back plate has a lower end;
said upper fastening location of said first strap section on said back plate and said lower end section of said back plate define a first distance (d1) therebetween;
the alternative fastening location on the extension plate and said lower end define a second distance (d2) therebetween; and,
said first distance (d1) is smaller than said second distance (d2).

4. The back carrier of claim 2, wherein the extension plate projects beyond said upper end of said back plate when the extension plate is mounted in said recess.

5. The back carrier of claim 2, wherein said back plate and the extension plate overlap each other in the direction of the longitudinal extent of the back plate.

6. The back carrier of claim 5, wherein:
the extension plate has a maximum height (h) in the direction of said longitudinal extent of said back plate; and,
the extension plate is configured to rest on said back plate with at least a quarter of said maximum height (h) when the extension plate is mounted on said back plate.

7. The back carrier of claim 2, wherein:
said back plate has a lateral width (sb) measured in a direction perpendicular to said longitudinal extent of said back plate;
said recess has a recess width (ab) measured in a direction perpendicular to said longitudinal extent of said back plate; and,
said recess width (ab) is at least two thirds as great as said lateral width (sb).

8. The back carrier of claim 2, wherein:
the extension plate has a width (b) measured in a direction perpendicular to said longitudinal extent of said back plate;
said back plate has a lateral width (sb) measured in a direction perpendicular to said longitudinal extent of said back plate; and,
said width (b) is at least two thirds as great as said lateral width (sb).

9. The back carrier of claim 2, wherein:
the extension plate has at least two alternative fastening locations as a substitute for said upper fastening location and said lower fastening location;
said at least two alternative fastening locations define a maximum mutual distance (smx) therebetween measured in a direction perpendicular to said longitudinal extent of said back plate;
the extension plate has a width (b) measured in a direction perpendicular to said longitudinal extent of said back plate; and,
said maximum mutual distance (smx) is at least two thirds as great as said width (b).

10. The back carrier of claim 2, wherein, when the extension plate is mounted in said recess, said back side of said back plate and the extension plate conjointly form a back surface for the back carrier.

11. The back carrier of claim 2, wherein the extension plate is configured to be connected to said back plate via a rigid connection.

12. The back carrier of claim 2, wherein:
said base defines a first opening therein;
the extension plate defines a second opening therein; and, said first opening and said second opening are configured to overlap when the extension plate is mounted in said recess so as to cause said first opening and said second opening to form a common receptacle for a hook.

13. The back carrier of claim 12, wherein said first opening extends completely through said back plate and the second opening extends completely through the extension plate.

14. An extension plate for a back carrier, the extension plate comprising:
an extension plate body formed as a single part;
said extension plate body being rigid;
said extension plate body having a greatest extension as width (b) in a lateral direction;
said extension plate body having a maximum height (h) measured in a vertical direction perpendicular to said lateral direction;
said extension plate body having a maximum thickness (t) measured in a thickness direction perpendicular to said lateral direction and to said vertical direction;
said width (b) being greater than said maximum height (h);
said maximum height (h) being greater than said maximum thickness (t);
said extension plate body having at least two fastening locations for two first strap sections of the back carrier; and,
at least two first attachment elements arranged on said extension plate body for attaching the extension plate to the back carrier;
said extension plate body, in said vertical direction, being composed of an upper half and a lower half;
said at least two first attachment elements being arranged in said lower half;
said at least two fastening locations being arranged in said upper half;
said extension plate body having a first thickness (t1) in said upper half and a second thickness (t2) in said lower half;
said first thickness (t1) being greater than said second thickness (t2);
said extension plate defining a central plane extending perpendicularly to the lateral direction;
said at least two attachment elements defining a minimal distance (a1, a2) to said central plane;
said at least two upper fastening locations defining a maximum distance (b1, b2) to said central plane;
said minimal distance (a1, a2) being greater than said maximum distance (b1, b2).

15. The extension plate of claim 14, wherein said extension plate body extends in an arched manner around said vertical direction.

16. The extension plate of claim 14, wherein the back carrier has a back plate and a shoulder strap; the back plate defines a longitudinal extent; the back plate has, in the direction of the longitudinal extent, an upper end section and a lower end section; the back plate has an upper end; the upper end section extends up to the upper end; the back plate has a load side configured to face a load to be carried and a back side configured to face a back of a user; the at least one shoulder strap extends on the back side of the back plate and has a first strap section and a second strap section; the at least one shoulder strap is configured to be fastened with the first strap section at an upper fastening location in the upper end section; the at least one shoulder strap is configured to be fastened with the second strap section at a lower fastening location in the lower end section; the back plate defines a recess configured to receive the extension plate; and, the recess is open to the upper end of the back plate in the direction of the longitudinal extent.

17. The back carrier of claim 1, wherein:
said recess is delimited on three sides by an edge;
said back plate has a lower end and a first side and a second side;
said edge delimits said recess toward said lower end of said back plate, said first side of said back plate and said second side of said back plate;
said at least two shoulder straps include a first shoulder strap and a second shoulder strap;
said at least two upper fastening locations include a first upper fastening location and a second upper fastening location;
said first shoulder strap is fastened at said first upper fastening location and said second shoulder strap is fastened at said second upper fastening location;
said first upper fastening location and said second upper fastening location defining a mutual distance to each other; and,
said recess has a width which is at least as great as said mutual distance between said first upper fastening location and said second upper fastening location.

* * * * *